(12) United States Patent
Sishtla

(10) Patent No.: US 9,080,797 B2
(45) Date of Patent: Jul. 14, 2015

(54) VARIABLE SPEED COMPRESSOR

(75) Inventor: Vishnu M. Sishtla, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 723 days.

(21) Appl. No.: 13/203,437

(22) PCT Filed: May 19, 2010

(86) PCT No.: PCT/US2010/035369
§ 371 (c)(1),
(2), (4) Date: Apr. 23, 2012

(87) PCT Pub. No.: WO2010/135407
PCT Pub. Date: Nov. 25, 2010

(65) Prior Publication Data
US 2012/0201698 A1    Aug. 9, 2012

Related U.S. Application Data

(60) Provisional application No. 61/179,514, filed on May 19, 2009.

(51) Int. Cl.
*F04B 49/10*    (2006.01)
*F25B 49/02*    (2006.01)
(Continued)

(52) U.S. Cl.
CPC ............ *F25B 49/022* (2013.01); *F04D 25/022* (2013.01); *F04D 27/0261* (2013.01); *F25B 2600/0253* (2013.01); *F25B 2700/21173* (2013.01); *Y02B 30/741* (2013.01)

(58) Field of Classification Search
CPC .......... F04B 49/10; F04B 49/106; F04B 9/08; F04B 49/065; F04D 25/022; F04D 27/0261; Y02B 30/741; F25B 49/022; F25B 2600/0253; F25B 2700/21173
USPC ........... 417/32, 31; 477/72; 475/199; 62/226, 62/227; 60/449
See application file for complete search history.

(56) References Cited

U.S. PATENT DOCUMENTS 2,888,810 A  *  6/1959  Hann ............................... 62/215
3,126,707 A  *  3/1964  Hann ............................... 60/389
(Continued)

FOREIGN PATENT DOCUMENTS

JP          3085383 A       4/1991
JP          5203008 A       8/1993
(Continued)

*Primary Examiner* — Peter J Bertheaud
*Assistant Examiner* — Dnyanesh Kasture
(74) *Attorney, Agent, or Firm* — Miller, Matthias & Hull LLP

(57) ABSTRACT

A compressor, as well as a lightweight and strong casting for a compressor, are disclosed. The compressor, which may be a reciprocating compressor for use in compressing high-pressure refrigerants such as $CO_2$, includes substantially reduced wall thicknesses (t) compared to prior art castings. The side walls of the compressor can be manufactured to such reduced thicknesses (t) through the use of a bridge spanning across the crankcase. This not only allows the opposing side walls to be manufactured of a thinner material, but the bottom cover removably mounted to the crankcase can be manufactured from a thinner and lighter material as well. Through the use of such a bridge, the resulting compressor is not only able to satisfy current strength requirements, but at significant weight, size and cost savings as well.

16 Claims, 3 Drawing Sheets

(51) Int. Cl.
*F04D 25/02* (2006.01)
*F04D 27/02* (2006.01)

(56) References Cited

U.S. PATENT DOCUMENTS

| | | | | |
|---|---|---|---|---|
| 3,752,013 | A | * | 8/1973 | Cross .............................. 475/32 |
| 4,351,160 | A | * | 9/1982 | Kountz et al. ................... 62/201 |
| 5,667,452 | A | * | 9/1997 | Coutant .......................... 475/81 |
| 5,887,674 | A | * | 3/1999 | Gray, Jr. ....................... 180/307 |
| 5,950,443 | A | * | 9/1999 | Meyer et al. ................. 62/228.5 |
| 5,983,652 | A | * | 11/1999 | Iritani et al. .................... 62/156 |
| 6,569,049 | B1 | | 5/2003 | Folsom et al. |
| 6,579,067 | B1 | | 6/2003 | Holden |
| 6,647,738 | B1 | | 11/2003 | Zhou et al. |
| 6,917,868 | B2 | | 7/2005 | Schreiber et al. |
| 7,966,839 | B2 | * | 6/2011 | McEnaney et al. .......... 62/228.4 |
| 2003/0116368 | A1 | | 6/2003 | Winkelman et al. |
| 2003/0166430 | A1 | | 9/2003 | Folsom et al. |
| 2005/0211231 | A1 | * | 9/2005 | Kelley, Jr. ..................... 123/559.1 |
| 2006/0225445 | A1 | | 10/2006 | Lifson et al. |
| 2007/0022765 | A1 | | 2/2007 | Lifson et al. |
| 2007/0033957 | A1 | | 2/2007 | Taras et al. |
| 2007/0277527 | A1 | * | 12/2007 | Brasz .............................. 60/616 |
| 2008/0131287 | A1 | | 6/2008 | Wilson et al. |
| 2008/0187298 | A1 | | 8/2008 | Holden et al. |
| 2008/0188347 | A1 | * | 8/2008 | Amisano et al. ................ 477/35 |
| 2008/0307813 | A1 | | 12/2008 | Lifson et al. |
| 2011/0061412 | A1 | * | 3/2011 | Bayram ......................... 62/222 |

FOREIGN PATENT DOCUMENTS

| | | | |
|---|---|---|---|
| JP | 2000265950 A | 9/2000 | |
| WO | WO 2007129039 A1 | * 11/2007 | ............. F25B 11/02 |

* cited by examiner

VARIABLE SPEED COMPRESSOR

CROSS-REFERENCE TO RELATED APPLICATION

This is a US national phase patent application of International Patent Application No. PCT/US10/03569 filed on May 19, 2010 filed pursuant to the Patent Cooperation Treaty and claim priority under 35 USC §119(e) to U.S. Provisional Patent Application Ser. No. 61/179,514 filed on May 19, 2010.

BACKGROUND

1. Technical Field

This disclosure is directed to air conditioning and refrigeration compressor control and more particularly, to variable speed compressors that incorporate continuous variable transmissions (CVTs).

2. Description of the Related Art

Refrigerant systems are utilized in many air conditioning and heat pump applications for cooling and/or heating the air entering an environment. The cooling or heating load on the environment may vary with ambient conditions, and as the temperature and/or humidity levels demanded by the occupant of the environment change. A compressor is used to compress a working fluid (i.e., the refrigerant) from initial (suction) conditions to compressed (discharge) conditions.

In some refrigerant systems, a single compressor is utilized to compress the refrigerant and move the refrigerant through the cycle connecting indoor and outdoor heat exchangers in a closed loop. However, under many circumstances, it is desirable to have the ability to vary the capacity, or amount of cooling or heating provided by the refrigerant system.

To vary the capacity of a compressor, variable speed drives (VSDs) are known for driving compressors at variable speeds in a refrigerant system. By driving the compressor at a higher or lower speed, the amount of refrigerant that is compressed per unit of time changes, and thus the system capacity can be adjusted. A VSD also allows the removal of all unloading hardware from the compressor system. In typical applications involving more than one compressor, such as multiple circuit chillers, multiplexed compressor chillers, refrigeration and compressor racks, a VSD may be used with each compressor to selectively unload compressors as necessary based on system demand. In general, early VSD designs required a constant voltage:frequency ratio. On the other hand, modern inverters within VSDs provide the ability to adjust both frequency and voltage independently of each other, but the voltage:frequency ratio is preset when the VSD is matched with a motor for a given application.

VSDs are expensive and therefore, multiple compressor systems requiring multiple variable speed drives are also expensive. In addition, the need for multiple VSDs adds to the complexity and size of the air conditioning or refrigeration system.

As illustrated in FIG. 1, an exemplary compressor 10 is powered by a hermetic motor 11 which is, in turn, powered by a variable speed drive VSD 12. The VSD 12 supplies a modulated alternating current output having a characteristic output voltage and output frequency. The VSD 12 receives power from a power supply (e.g., 460 VAC, 60 Hz). A gearbox or variable ratio transmission 13 enables the ratio of motor 11 speed to compressor 10 speed to vary. The hermetically sealed casing is shown schematically at 14.

The torque required by the compressor 10 (and thus supplied by the motor 11) will essentially be a function of the load (e.g., the air conditioning load), the saturated suction temperature (SST) and saturated discharge temperature (SDT). A given motor speed is associated with a proportional frequency position on the fixed voltage/frequency curve of the VSD. At a given point on the voltage/frequency curve, however, the current draw of the drive will accordingly be determined by the SST and SDT values. For example, at a given voltage and frequency, if the SDT were to increase suddenly, the torque would increase at a given speed thus necessitate a power increase from the VSD and, accordingly, a current increase. As a result, the operating efficiency of a variable speed compressor equipped with currently available VSDs remains a concern.

A water-cooled chiller is a machine that removes heat from water via a vapor-compression or absorption refrigerant cycle. A vapor-compression water chiller comprises the four major components of the vapor-compression refrigerant cycle: compressor; evaporator; condenser; and some form of metering device. Water-cooled chillers can employ a variety of refrigerants. Chilled water is often used to cool and dehumidify air in mid- to large-size commercial, industrial, and institutional facilities. Chillers can be water-cooled, air-cooled or evaporatively cooled. Water-cooled chillers may incorporate the use of cooling towers which improve the thermodynamic effectiveness of the chiller as compared to air-cooled chillers.

Large tonnage water-cooled chillers (above 2000 tons) typically use open drive centrifugal compressors powered by electric motors. This is due to unavailability of hermetic motors like the one shown at 11 in FIG. 1 that can deliver power levels above 2000 hp (~1500 kW). Also, the input power for these applications tends to be between 4.16 kV to 11 kV. VSDs for medium (4.16 kV) and high voltage (6.9 kV) compressors are very expensive and consume a lot of space, thereby presenting installation problems. Still further, in the Middle East, the input power for large tonnage water-cooled chillers is 11 kV. VSDs for this voltage are not commercially available and must be custom built.

Accordingly, there is a need for an improved variable speed compressor design that does not rely upon a variable speed drive or a VSD.

SUMMARY OF THE DISCLOSURE

In satisfaction of the above-described needs, a cooling system is disclosed that comprises a drive motor that is connected to a proximal drive shaft. The proximal drive shaft is connected to a continuous variable transmission (CVT). The CVT is connected to an output drive shaft that is connected to a rotor disposed within a compressor. The compressor is connected to an evaporator, which is connected to a condenser, which is connected to the compressor thereby forming a vapor-compression refrigerant cycle. A controller is linked to the CVT and a sensor for detecting a leaving chilled water temperature in the evaporator. The controller increases the output of the CVT to the output drive shaft when the leaving chilled water temperature is above a set point. In contrast, the controller decreases the output of the CVT to the output drive shaft when the leaving chilled water temperature is below the set point. The CVT may be a hydrostatic or hydraulic, hydro-mechanical or mechanical (e.g., adjustable pulley) type CVT.

A method of cooling air is disclosed that comprises providing a cooling system comprising a drive motor that is connected to a proximal drive shaft. The proximal drive shaft is connected to a continuous variable transmission (CVT). The CVT is connected to an output drive shaft that is connected to a rotor disposed within a compressor. The compressor is connected to an evaporator which is connected to a condenser, which is connected to the compressor thereby forming a vapor-compression refrigerant cycle. The method includes measuring a leaving chilled water temperature in the evaporator, comparing the measured leaving chilled water temperature with a predetermined set point, increasing the output of the output drive shaft when the leaving chilled water temperature is above the set point, and decreasing the output of the CVT to the output drive shaft when the leaving water temperature is below the set point.

Other advantages and features will be apparent from the following detailed description when read in conjunction with the attached drawings.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
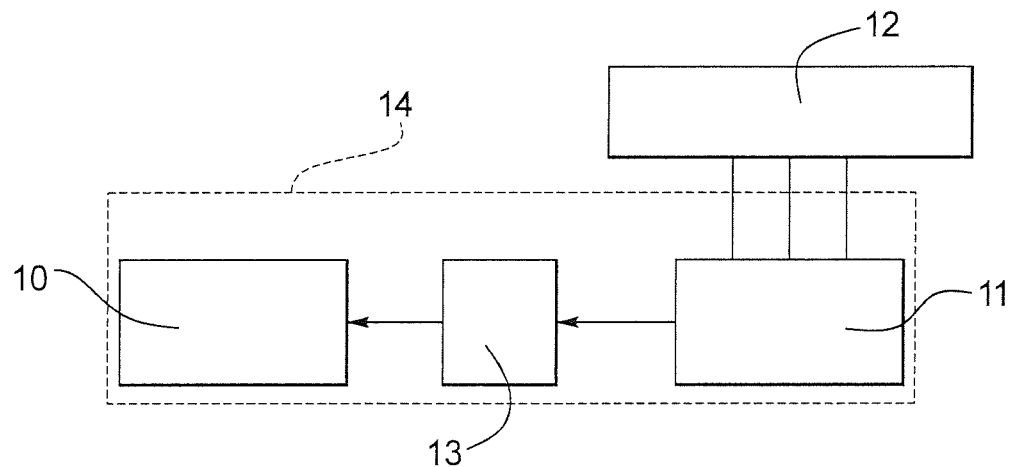
FIG. 1 schematically illustrates a variable speed compressor with a variable frequency drive or variable speed drive (VSD)
Figure 2:
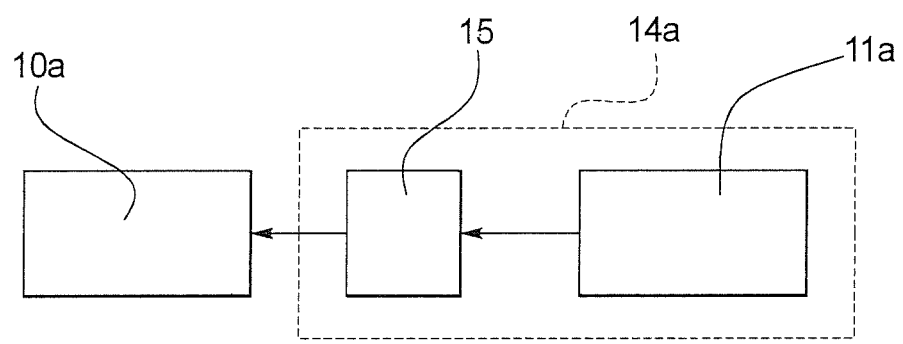
FIG. 2 illustrates a disclosed variable speed compressor equipped with a continuously variable transmission (CVT); and, FIG. 3 schematically illustrates a disclosed hydrostatic or hydraulic CVT for use with a disclosed variable speed compressor.

Turning to FIG. 2, a compressor 10a and motor 11a are coupled to a continuous variable transmission (CVT) 15. The motor 11a may or may not be hermetically sealed within a casing 14a. Thus, the design of FIG. 2 is applicable to both hermetic and open systems. The CVT 15 eliminates the need for the costly combination of a gearbox 13 and VSD 12 of the prior art system shown in FIG. 1. Further, the prior art system shown in FIG. 1 can only be constructed economically as a hermetic system with a hermetic casing 14 and lower capacity motor 11 as VSDs 12 are not readily available for larger motors 11a, which can provide power exceeding 2000 hp or 1500 kW. Systems requiring higher capacities require multiple compressors 10, gear boxes 13, motors 11, VSDs 12 and the costs associated therewith. Of course, in addition to be suitable for higher capacities, the system illustrated in FIG. 2 is also applicable to lower capacity systems.

Figure 3:
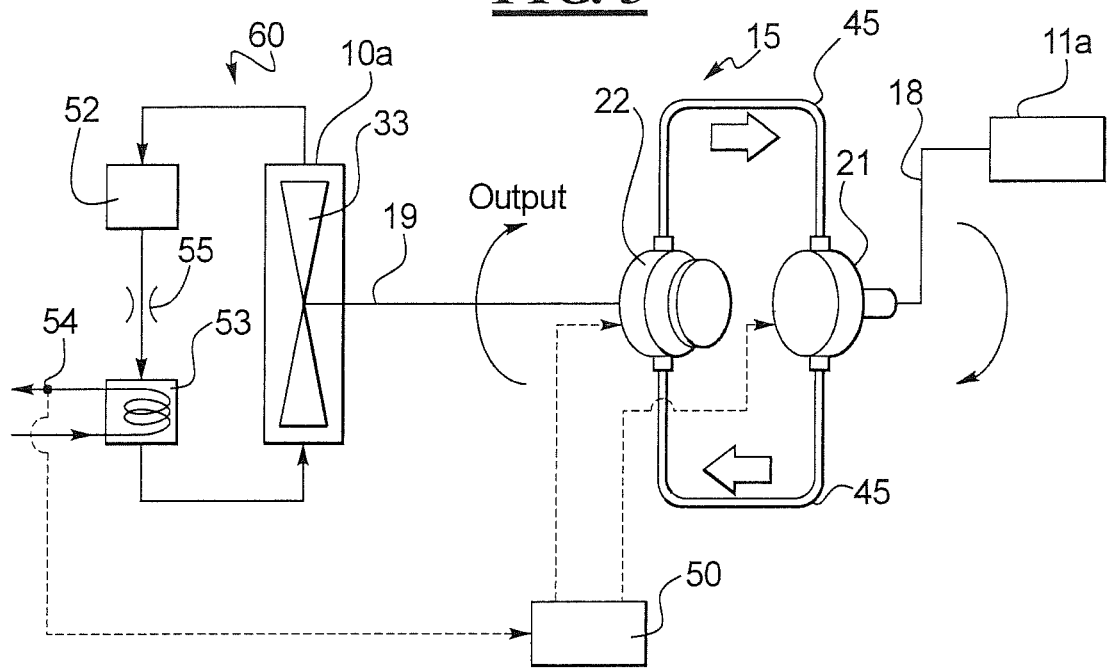
Figure 4:
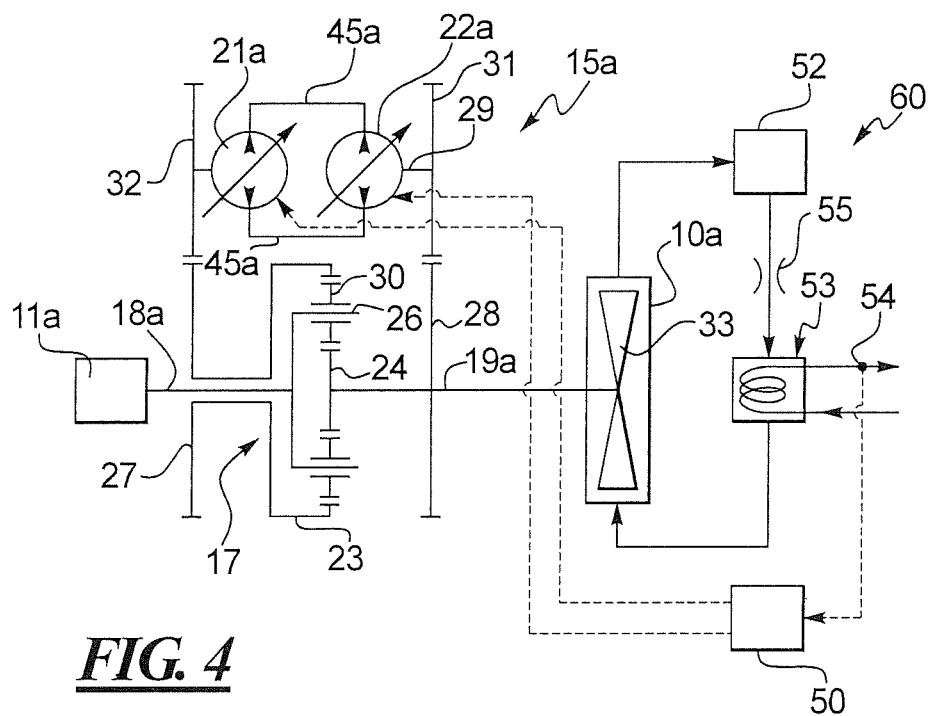
FIG. 4 schematically illustrates a disclosed hydro-mechanical CVT for use with a disclosed variable speed compressor.
Figure 5:
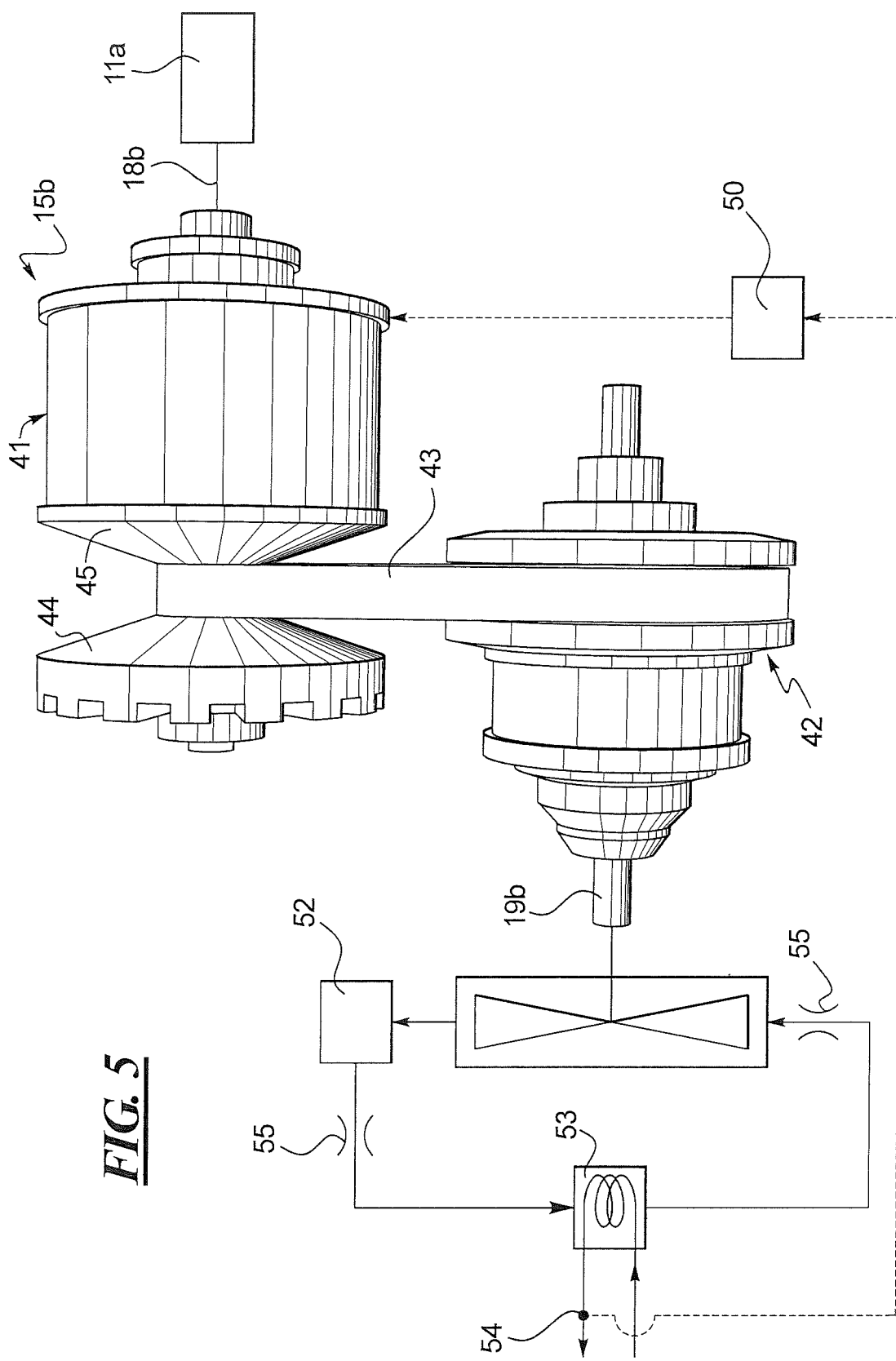
FIG. 5 schematically illustrates a disclosed pulley-based CVT for use with a disclosed variable speed compressor.

Suitable designs for CVTs 15, 15a, 15b are illustrated in FIGS. 3-5 and include hydraulic or hydrostatic, hydro-mechanical and purely mechanical CVTs. Referring first to FIG. 3, a hydrostatic or hydraulic CVT 15 is illustrated whereby input power from the motor 11a is delivered to a hydraulic pump 21 through an input shaft 18. The motor 11a may be operated at a constant speed. A continuous loop 45 connects the hydraulic pump 21 to a hydraulic motor 22. The variable-displacement hydraulic pump 21 is used to vary the fluid flow into hydrostatic motor 22. The rotational motion of the motor 11a operates the hydrostatic pump 21 and the pump 21 converts the rotational motion into fluid flow through the loop 45. Then, with the hydrostatic motor 22 located on the driven side of loop 45, the fluid flow is converted back into rotational motion of an output shaft 19.

The output shaft 19 is connected to an impeller 33 of the compressor 10a. The compressor 10a is part of a refrigerant cycle 60 which includes a condenser 52 that receives fluid from the compressor 10a and delivers evaporated fluid to the evaporator 53 through a restriction orifice 55 and back into the compressor 10a.

A controller 50 is utilized to control the speeds of the hydraulic pump 21 and hydraulic motor 22 based on the "leaving chilled water temperature" at the evaporator 53 indicated at 54 in FIG. 3 (and FIGS. 4-5). While the disclosed systems 15, 15a, 15b, 60 are particularly adaptable to large water chillers, other applications will be apparent to those skilled in the art the controller 50 will control the speed of the hydraulic pump 21 and hydraulic motor 22 in response to changes in the load to the refrigerant cycle 60, as measured by the leaving chilled water temperature at 54. Thus, the leaving chilled water temperature at 54 are shown as input signals to the controller 50 in FIGS. 3-5 and the links between the controller 50 and the hydraulic pumps 21, 21a, hydraulic motors 22, 22a and pulley 41 are shown as output signals in FIGS. 3-5.

In FIG. 4, a hydrostatic CVT like the one shown at 15 in FIG. 3 is combined with a planetary gear set 17 and appropriate clutches (not shown) to create a hybrid system referred to as a hydro-mechanical CVT 15a. The hydro-mechanical CVT 15a transfers power from the drive motor 11a to the compressor 10a in three different modes. At a low speed, power is transmitted hydraulically using the hydraulic pump 21a and hydraulic motor 22a; at a high speed, power is transmitted mechanically by the drive motor 11a through the gear set 17; between these extremes, the CVT 15a uses both hydraulic and mechanical means to transfer power to the output shaft 19a.

The drive motor 11a is connected to the planetary gear set 17 by the proximal drive shaft 18a. The planetary gear set 17 divides the power delivered by the proximal drive shaft 18a from the motor 11a into two output power paths: one output power path passing to the distal output shaft 19a through the ring gear 23, planetary gear 30, carrier 26 and sun gear 24; and the second output power path that drives a hydraulic pump 21a through the action of the spur gear 27 and input pump gear 32. The pump 21a, in turn, drives a hydrostatic or hydraulic motor 22a via the loop 45a. The hydraulic motor 22a is linked or coupled to the output shaft 19a via the gears shown at 31, 28.

Regarding the power path from the motor 11a to the output shaft 19, the proximal drive shaft 18a is connected to a ring gear 23 of the planetary gearset 17. The ring gear 23 is coupled to a sun gear 24 by the planetary gear 30 and carrier 26. The sun gear 24 is coupled to or connected to the output drive shaft 19a.

Regarding the second mechanical power path to the pump 21a, rotational power is delivered from the motor 1a to the pump 21a via the gears 27, 32. The hydraulic pump 21a drives the hydraulic motor 22a that may be geared to the output shaft 19a through the hydraulic motor output shaft 29, output gear 31 and the shaft gear 28 that is connected to the output shaft 19a.

The power that is delivered to the planetary gear set 17 is therefore split to drive the hydraulic pump 21a and to drive the output shaft 19a directly. If the hydraulic pump 21a is at zero or its minimum displacement and the hydraulic motor 22a is at its maximum displacement, the hydraulic pump 21a will 'freewheel' and rotate without producing any flow or pressure to the hydraulic motor 22a. As the hydraulic pump 21a cannot put any reaction torque on the planetary gearset 17 when the hydraulic pump 21a is at zero or its minimum displacement, there can be no torque (and hence no power) going to the output shaft 19a from the hydraulic motor 22a. All power to the output shaft 19a is provided by the drive motor 11a through the carrier 26 and sun gear 24. In this scenario, the hydraulic pump 21a is set at its minimum displacement in the hydraulic motor 22a at its maximum displacement. The gear 31 spins at a high rotational velocity but the rotational velocity of the output shaft 19a and compressor 10a is dictated by the drive motor 11a.

On the other hand, if a small amount of displacement is given to the hydraulic pump 21a, the gear 27 will engage the gear 32 causing the pump 21a to generate high pressure and a small flow rate to the hydraulic motor 22a. This high pressure and small flow rate acts upon the hydraulic motor 22a to produce high torque and low speed that is transmitted to the output drive shaft 19a via the gears 31, 28. The hydraulic pump 21a under these conditions is also creating a reaction torque on the planetary gearset 17 which results in mechanical torque (and hence power) going directly to the output shaft 19a through the ring gear 23, carrier 26, and sun gear 24, which combines with the power delivered from the hydraulic motor 22a via the gears 31, 28.

When the hydraulic pump 21a is at its maximum displacement and the hydraulic motor 22a is at its minimum displacement, the hydraulic motor 22a cannot accept the flow rate from the hydraulic pump 21a. This has the effect of locking the ring gear 23 to the planetary gear 30, carrier 26 and sun gear 24 so the sun gear 24 (and hence the output shaft 19a) rotates at its highest rotational velocity, and about 100% of the power of the hydraulic pump 21a is translated mechanically to the output shaft 19a. The hydraulic motor 22a is now freewheeling at zero displacement or torque to the output shaft 19a. Because all power from the hydraulic pump 21a is now going to the output shaft 19a mechanically via gears 23, 30, 26, 24, the CVT 15a efficiency is very high when the hydraulic pump 21a is operating at its maximum displacement.

The CVT 15a as illustrated in FIG. 4 is ideal for large-scale centrifugal compressors 10a because the power requirement increases with the cube of the impeller 33 speed, not linearly. As the CVT 15a increases the impeller 33 speed within the compressor 10a, additional power is fed mechanically to the output shaft 19a and not hydraulically through the hydraulic motor 22a of the CVT 15a. The supplemental use of mechanical power from the hydraulic pump 21a through the gears 32, 27, 23, 30, 26, 24 to the output shaft 19a reduces power loss when the CVT 15a is not operating at its fastest output speed, but the use of supplemental mechanical power also significantly reduces the size and power capacity requirements of the hydraulic circuit 21a, 22a, 45a. For a 2000 hp (~1500 kW) compressor 10a, the CVT 15a needs a maximum of only about 200 hp (~150 kW) transmitted thru the hydraulic circuit 21a, 22a, 45a.

The CVT 15a eliminates the need for varying the speed of the drive motor 11a or utilizing a controller 50 to control the speed of the drive motor 11a. The controller 50 may be used to adjust the displacements of the hydraulic pump 21a and hydraulic motor 22a in response to the leaving chilled water temperature measured at 54 on the leaving chilled water side in the evaporator 53. Instead, the drive motor 11a may be operated at a constant speed.

Turning to FIG. 5, the drive motor 11a is connected to a pulley-based CVT 15b by the drive shaft 18b which is connected to a variable-diameter pulley 41. The pulley 41 includes a pair of opposing cones 44, 45. A belt 43 rides in the groove between the two cones 44, 45. V-belts are preferred if the belt is made of rubber although steel belts are becoming commonplace.

When the two cones 44, 45 of the pulley are spread apart, the effective pulley diameter increases, the belt 43 rides lower in the groove, and the radius of the belt loop going around the pulley gets smaller. When the cones 44, 45 are pulled closer together, the effective pulley diameter decreases, the belt 42 rides higher in the groove, and the radius of the belt loop going around the pulley gets larger. The CVT 15b of FIG. 5 may use hydraulic pressure, centrifugal force or spring tension to create the force necessary to adjust the pulley halves 44, 45. A controller 50 may be utilized to control the mechanism pulling the halves 44, 45 apart and moving the halves 44, 45 closer together. Input to the controller 50 will again include the leaving chilled water temperature at 54.

INDUSTRIAL APPLICABILITY

In satisfaction of the above-described need, a large tonnage water chiller 60 is disclosed that comprises a drive motor 11a connected to a shaft 18. The drive shaft 18 is connected to a continuous variable transmission (CVT) 15, 15a, 15b. The CVT 15, 15a, 15b that is linked to a controller 50. The controller 50 may controls the operation of the CVT 15, 15a. 15b based on the leaving chilled water temperature at 54. The output shaft 19, 19a, 19b of the CVT 15, 15a, 15b is linked to a refrigerant cycle 60.

The refrigerant cycle 60 includes the compressor 10a, evaporator 53, condenser 52 and metering orifice 55. The controller 50 may control the flow of fluid through the refrigerant cycle 60 by controlling the speed of the hydraulic pump 21, 21a, hydraulic motor 22, 22a or spacing of the pulley halves 44, 45. In operation, the controller 50 may take an input signal from the leaving chilled water temperature at 54 (i.e. and compares to a set point). If the chilled water temperature leaving the chiller evaporator 53 is below the set point, then the output speed of the hydraulic pump 21, 21a is reduced by increasing the displacement of the hydraulic motor 22, 22a and reducing the hydraulic pump 21, 21a displacement. Alternatively, the output of the variable diameter pulley 41 is reduced. If the leaving chilled water temperature at 54 is above the set point then the output speed of the hydraulic pump 21, 21a is increased by increasing the pump 21, 21a displacement and reducing the hydraulic motor 22, 22a displacement. Alternatively, the output of the variable diameter pulley 41 is increased.

While only certain embodiments have been set forth, alternatives and modifications will be apparent from the above description to those skilled in the art. These and other alternatives are considered equivalents and within the spirit and scope of this disclosure and the appended claims.

The invention claimed is:
1. A cooling system comprising:
a drive motor connected to a proximal drive shaft the proximal drive shaft connected to a continuous variable transmission (CVT), the CVT is connected to an output drive shaft that is connected to a rotor disposed within a compressor, the compressor is connected to an evaporator, which is connected to a condenser which is connected to the compressor thereby forming a vapor-compression refrigerant cycle; and a controller is linked to the CVT and a sensor for detecting a leaving chilled water temperature in the evaporator and the condenser, the controller increases the output speed of the CVT to the output drive shaft when the leaving chilled water temperature is above a set point, the controller decreases the output speed of the CVT to the output drive shaft when the leaving chilled water temperature is below the set point, wherein the CVT comprises a hydraulic pump that is connected to the proximal drive shaft and a planetary gear set, the planetary gear set is linked to the output drive shaft, the hydraulic pump is in fluid communication with a hydraulic motor, the hydraulic motor is linked to the output drive shaft, the controller is linked to both the hydraulic pump and the hydraulic motor, and the controller is programmed to decrease the output speed of the hydraulic motor to the output drive shaft and increase the output of the drive motor to the output shaft when the leaving refrigerant temperature is above a set point, the controller is programmed to increase the output speed of the hydraulic motor and decrease the output of the drive motor to the output drive shaft when the leaving chilled water temperature is below the set point.

2. The cooling system of claim 1, wherein the drive motor, CVT and compressor are enclosed in a hermetically sealed casing.

3. The cooling system of claim 1, wherein the drive motor and CVT are disposed in an open casing.

4. The cooling system of claim 1, wherein an input voltage to the drive motor is at least about 4.16 kV.

5. The cooling system of claim 1, wherein an input voltage to the drive motor is at least about 6.9 kV.

6. The cooling system of claim 1, wherein an input voltage to the drive motor is at least about 11 kV.

7. The cooling system of claim 1, wherein the cooling system is a water-cooled chiller having a capacity of at least 2000 tons.

8. A method of cooling air comprising:
providing a cooling system comprising a drive motor that is connected to a proximal drive shaft, the proximal drive shaft is connected to a continuous variable transmission (CVT), the CVT is connected to an output drive shaft that is connected to a rotor disposed within a compressor, the compressor is connected to an evaporator which is connected to a condenser which is connected to the compressor thereby forming a vapor-compression refrigerant cycle;

measuring a leaving chilled water temperature in the evaporator;

comparing the measured leaving chilled water temperature with a predetermined set point;

increasing the output speed of the CVT to the output drive shaft when the leaving chilled water temperature is above the set point; and decreasing the output speed of the CVT to the output drive shaft when the leaving chilled water temperature is below the set point, wherein the CVT comprises a hydraulic pump that is connected to the proximal drive shaft and a planetary gear set, the planetary gear set is linked to the output drive shaft, the hydraulic pump is in fluid communication with a hydraulic motor, the hydraulic motor is linked to the output drive shaft, decreasing the output speed of the hydraulic motor to the output drive shaft and increasing the output of the drive motor to the output shaft when the leaving chilled water temperature is above the set point, and increasing the output speed of the hydraulic motor and decreasing the output of the drive motor to the output drive shaft when the leaving chilled water temperature is below the set point.

9. The method of claim 8, wherein the rotor is an impeller.

10. The method of claim 8, wherein the drive motor, CVT and compressor are enclosed in a hermetically sealed casing.

11. The method of claim 8, wherein the drive motor and CVT are disposed in an open casing.

12. The method of claim 8, further comprising inputting an input voltage to the drive motor that is at least about 4.16 kV.

13. The method of claim 8, further comprising inputting an input voltage to the drive motor that is at least about 6.9 kV.

14. The method of claim 8, further comprising inputting an input voltage to the drive motor that is at least about 11 kV.

15. The method of claim 8, further comprising:
compressing fluid in the compressor;
delivering the compressed fluid to the evaporator;
evaporating the fluid in the evaporator;
delivering the evaporated fluid to the condenser;
delivering the evaporated fluid to the compressor.

16. The method of claim 8, wherein the cooling system has a capacity of at least 2000 tons.

* * * * *